(12) United States Patent
Ikeda

(10) Patent No.: US 8,891,933 B2
(45) Date of Patent: Nov. 18, 2014

(54) PLAYBACK APPARATUS AND PLAYBACK METHOD

(75) Inventor: Takeshi Ikeda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/047,266

(22) Filed: Mar. 14, 2011

(65) Prior Publication Data

US 2011/0235996 A1   Sep. 29, 2011

(30) Foreign Application Priority Data

Mar. 29, 2010   (JP) ................. 2010-074966

(51) Int. Cl.
| | |
|---|---|
| H04N 5/77 | (2006.01) |
| G11B 27/10 | (2006.01) |
| G11B 27/11 | (2006.01) |
| H04N 5/765 | (2006.01) |
| H04N 9/82 | (2006.01) |

(52) U.S. Cl.
CPC ............ *H04N 9/8205* (2013.01); *G11B 27/105* (2013.01); *G11B 27/11* (2013.01); *H04N 5/765* (2013.01)
USPC .......................................... 386/218; 386/248

(58) Field of Classification Search
None
See application file for complete search history.

(56) References Cited

U.S. PATENT DOCUMENTS

| | | | | |
|---|---|---|---|---|
| 5,926,206 | A * | 7/1999 | Mihara et al. ................. | 725/102 |
| 8,600,211 | B2 | 12/2013 | Nagano et al. | |
| 2003/0038830 | A1* | 2/2003 | Bean et al. ..................... | 345/719 |
| 2004/0250294 | A1* | 12/2004 | Kim .............................. | 725/135 |
| 2006/0149682 | A1* | 7/2006 | Ikeda .............................. | 705/57 |
| 2008/0313682 | A1* | 12/2008 | Kajiura ........................... | 725/93 |
| 2009/0066845 | A1* | 3/2009 | Okuda .......................... | 348/700 |
| 2010/0034519 | A1* | 2/2010 | Kato et al. .................... | 386/108 |

FOREIGN PATENT DOCUMENTS

| | | |
|---|---|---|
| JP | 08-263929 A | 10/1996 |
| JP | 2007-150747 | 6/2007 |
| JP | 2009141895 A | 6/2009 |

OTHER PUBLICATIONS

The above references were cited in a Feb. 25, 2014 Japanese Office Action, of which is enclosed with an English Translation, that issued in Japanese Patent Application No. 2010-074966.

* cited by examiner

*Primary Examiner* — William C Vaughn, Jr.
*Assistant Examiner* — Eileen Adams
(74) *Attorney, Agent, or Firm* — Cowan, Liebowitz & Latman, P.C.

(57) ABSTRACT

A playback apparatus and a playback method are provided that are capable of playing back video from an appropriate viewpoint upon the resumption of the playback of plural viewpoint video content or arbitrary viewpoint video content after the playback thereof is stopped. The record/playback apparatus 1 has a function that plays back a plural viewpoint video or an arbitrary viewpoint video. The viewpoint information storage section 19 stores information about a first viewpoint specified prior to an interruption when the playback of the video is interrupted. Depending on a user's operation instruction action made during the interruption period and the length of the interruption period, the control section 17 selects a first viewpoint or a second viewpoint previously specified for a playback video upon the resumption of the playback of the video and carries out control so as to playback the video at the viewpoint. The control section 17 provides instructions about the viewpoint switching to the viewpoint switching control section 11, and provides instructions to the GUI control section 12 about providing a viewpoint switching notification to a user.

24 Claims, 8 Drawing Sheets

PLAYBACK APPARATUS AND PLAYBACK METHOD

BACKGROUND OF THE INVENTION

1. Field of the Invention

The present invention relates to a playback apparatus and a playback method that plays back multi-viewpoint video data or arbitrary viewpoint video data.

2. Description of the Related Art

Televisions (digital television apparatuses) that are capable of receiving digital broadcasts have become popular. Currently, in the age of full-fledged digital broadcast, research and development on various next-generation broadcast systems have been carried out. Among them, display technologies of a "plural viewpoint video" (e.g., multi-viewpoint video), by which a viewer can select a viewpoint from a plurality of camera viewpoints, or display technologies of an "arbitrary viewpoint video", by which a viewer can arbitrarily provides instructions about the viewpoint, have received attention. Japanese Patent Laid-Open No. 2007-150747 discloses an apparatus that receives a broadcast stream including a broadcasting video and the viewpoint information about the video. When a distribution request for an arbitrary viewpoint video is made, this apparatus utilizes the viewpoint information extracted from the broadcast stream as the viewpoint initial value for the arbitrary viewpoint video.

As a next-generation digital broadcast service, the provision of a multi-viewpoint video or an arbitrary viewpoint video is further expected to become popular. In a next-generation record/playback apparatus, an apparatus that can record/playback data for a multi-viewpoint video or an arbitrary viewpoint video is desired.

In the playback apparatus for a plural viewpoint video or an arbitrary viewpoint video, assume the case in which video data is played back and then resumed after an interruption period. If a viewer views another program or content during the interruption period, the following situation may occur. For example, a viewer may forget the fact that the program played back after interruption is a multi-viewpoint video program or may misunderstand the fact that the playback screen of a multi-viewpoint video is the viewpoint of a normal broadcast program and keep viewing the playback screen. As a result, there is a possibility that a viewer may miss the opportunity of viewing a normal broadcast or the other multi-viewpoint video, and thus may not effectively utilize a multi-viewpoint video broadcast service. In addition, some viewpoints may cause a viewer to be unable to grasp the entire state. Furthermore, as the interruption period is extended, the entire flow of a program and a temporal before-and-after relationship may become unclear.

Accordingly, the present invention provides a playback apparatus and a playback method that are capable of playing back video from an appropriate viewpoint upon the resumption of the playback of plural viewpoint video content or arbitrary viewpoint video content after the playback thereof is stopped.

SUMMARY OF THE INVENTION

In view of the foregoing, according to an aspect of the present invention, a playback apparatus that is capable of playing back a specified viewpoint video when viewing plural viewpoint video content or arbitrary viewpoint video content is provided that includes a viewpoint information storage unit configured to store information about a first viewpoint specified prior to an interruption when the playback of the video is interrupted; and a control unit configured to carry out control so as to determine whether or not an operation instruction action for viewing other content is performed during the period of playback interruption when the playback of the video is resumed, playback a second viewpoint video previously specified for the video when the operation instruction action is made, and playback the first viewpoint video indicated by the information read out from the viewpoint information storage unit when the operation instruction action is not made.

According to the present invention, video can be played back from an appropriate viewpoint upon the resumption of the playback of the video.

Further features of the present invention will become apparent from the following description of exemplary embodiments with reference to the attached drawings.

DESCRIPTION OF THE EMBODIMENTS

Hereinafter, preferred embodiments of the present invention will now be described with reference to the accompanying drawings. Note that the following description will be given of an apparatus and a method that process a multi-viewpoint video as an example of a multi-viewpoint video or an arbitrary viewpoint video.

First Embodiment

Figure 1:
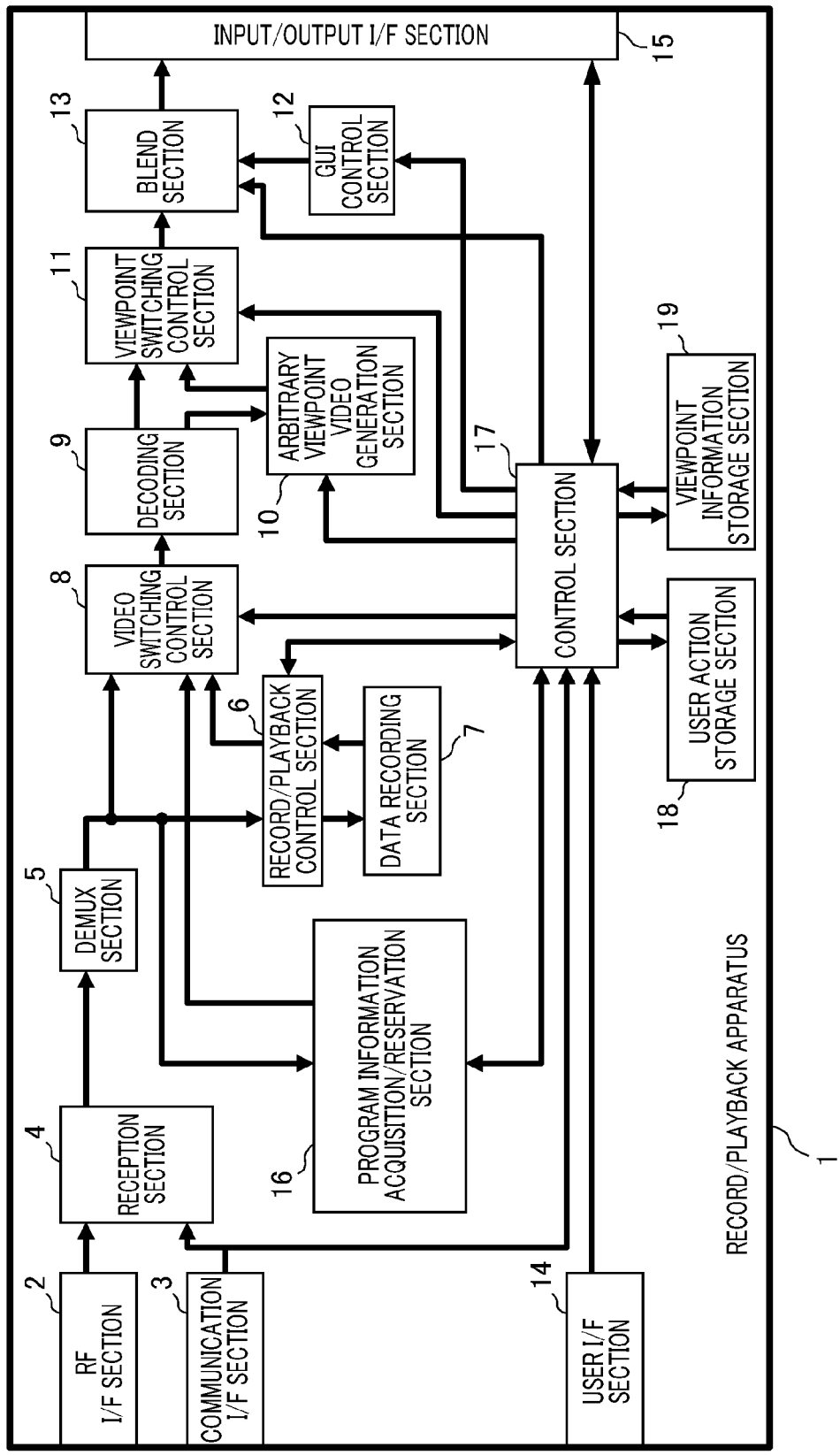
FIG. 1 is a functional block diagram illustrating an example of the configuration of a record/playback apparatus according to a first embodiment of the present invention in conjunction with FIGS. 2 and 3.

FIG. 1 is a functional block diagram illustrating an example of the configuration of a record/playback apparatus according to a first embodiment of the present invention. Although the present apparatus records and plays back data relating to a plural viewpoint video or an arbitrary viewpoint video, the present invention is applicable to various apparatuses that are capable of playing back a plural viewpoint video or an arbitrary viewpoint video. In the first embodiment, when the playback of video is interrupted, a first viewpoint specified prior to an interruption or a second viewpoint previously specified for a playback video is selected upon the resumption of the playback of the content of the video.

A record/playback apparatus 1 has an interface (hereinafter referred to as "I/F") relating to input/output processing of video data and a user I/F for a user operation. An RF (Radio Frequency) I/F section 2 is an interface that receives an RF signal serving as a broadcast wave, and receives an RF signal from an external antenna (not shown). A communication I/F section 3 is an interface that receives data via a network such as Internet or receives video data of a broadcast program and other information which are sent from a broadcast station server via a network. The communication I/F section 3 is connected with a control section 17, and transfers control data obtained from a network to the control section 17. Also, the communication I/F section 3 transmits data obtained from the control section 17 to the broadcast station server via a network.

A reception section 4 converts a signal sent from the RF I/F section 2 and the communication I/F section 3 into a TS (Transport Stream) signal. Also, the reception section 4 selects the channel number of the broadcast station to be received in accordance with the instruction given by the control section 17.

A DEMUX (Demultiplexer) section 5 divides a TS signal into a block of a packet signal such as a video signal and an audio signal and separates it into a video signal, an audio signal, program data, and the like. Program data is sent to a program information acquisition/reservation section 16 and a record/playback control section 6, and a video signal and an audio signal are sent to the record/playback control section 6 and a video switching control section 8.

The record/playback control section 6 provides instructions to record a video signal, an audio signal, and program data obtained from the DEMUX section 5 to a data recording section 7 based on the instruction given by the control section 17. Also, the record/playback control section 6 provides instructions to the data recording section 7 based on the instruction given by the control section 17, and controls readout of program video data and program information data. Program information includes data indicating the genre of the content or the like. The record/playback control section 6 sends the video data read out from the data recording section 7 to the video switching control section 8, and sends the readout program information data to the control section 17. The data recording section 7 receives the instruction given by the record/playback control section 6 and then stores data or reads out the stored data to send out to the record/playback control section 6.

A video switching control section 8 selects a video signal and an audio signal obtained from the DEMUX section 5, a video signal and an audio signal obtained from the record/playback control section 6, and a video signal such as a program table, a program guide, or the like obtained from the program information acquisition/reservation section 16 in accordance with the instruction given by the control section 17 to thereby send them to the decoding section 9 provided on the rear stage. A decoding section 9 decodes an encoded video signal (MPEG, H.264, AVCHD, and the like) and an audio signal, and converts them into a video format signal and an audio signal to send them to an arbitrary viewpoint video generation section 10 and a viewpoint switching control section 11 provided on the rear stage. When a video signal is not encoded, the video switching control section 8 sends a video signal to the arbitrary viewpoint video generation section 10 and the viewpoint switching control section 11 provided on the rear stage without performing decode processing.

An arbitrary viewpoint video generation section 10 generates video data of a viewpoint desired by a user based on an arbitrary viewpoint video signal and viewpoint information sent from the decoding section 9 and information about the position and the angle of a desired viewpoint sent from the control section 17. The viewpoint switching control section 11 selects and outputs a multi-viewpoint video sent from the decoding section 9 or an arbitrary viewpoint video sent from the arbitrary viewpoint video generation section 10 in accordance with the instruction given by the control section 17. In the case of a multi-viewpoint video, the viewpoint switching control section 11 selects data relating to the video of one or more viewpoints from a plurality of viewpoints based on the instruction given by the control section 17 to thereby send them to the blend section 13 provided on the rear stage. Also, after video selection, the viewpoint switching control section 11 performs reduction or enlargement processing for the specified viewpoint video based on the instruction given by the control section 17 to thereby send the resulting video to the blend section 13 provided on the rear stage.

A GUI (Graphical User Interface) control section 12 receives the instruction given by the control section 17 to create graphics data. The data is data for use in channel display, graphics display such as camera angle, camera position, or the like for a single viewpoint of a plural viewpoint video or an arbitrary viewpoint video, a program table, a list of the recorded contents, and the like. The generated graphics data is sent to the blend section 13. A blend section 13 receives the video data obtained from the viewpoint switching control section 11 and the graphics data obtained from the GUI control section 12 to thereby combine the video based on the instruction given by the control section 17. The blend section 13 sends the combined video signal to an input/output I/F section 15.

A user I/F section 14 has an input function that receives an operation instruction given by a user and conveys it to the control section 17. A user provides instructions such as, for example, channel switching, recording/playback/stop of program reservation or program, content deletion, viewpoint specification/selection, and the like using an operation unit such as a remote controller. The input/output I/F section 15 has an output function that outputs a signal to an external device (not shown), and an input function that receives a signal from an external device. The input/output I/F section 15 outputs the video signal, which has been output from the blend section 13, to an external device. Also, when the input/output I/F section 15 is connected with a display device, the input/output I/F section 15 relays an operation instruction signal (an instruction signal or the like for channel switching on the display device side) or a status signal, which is transmitted from a display device to the input/output I/F section 15, and transmits it to the control section 17. The input/output I/F section 15 also serves as an interface section that transmits an instruction from the control section 17 to the display device.

A program information acquisition/reservation section 16 acquires a program table and program information from data received from the DEMUX section 5 and records them to a memory. Also, the program information acquisition/reservation section 16 receives an instruction from the control section 17 to thereby output a program table and program information. Furthermore, the program information acquisition/reservation section 16 receives an instruction from the control section 17 to thereby receive a reservation from the program table.

The control section 17 receives an operation instruction signal from the user I/F section 14 or the input/output I/F section 15 to thereby control configuration sections indicated by the reference numerals 3, 4, 6, 8, 10, and 16 and a storage sections 18 and 19 to be described below.

Next, a description will be given of a user action storage section 18 and a viewpoint information storage section 19 which are the characterizing components of the present invention.

The user action storage section 18 stores data indicating a user's operation instruction action (hereinafter referred to as a "user action") received from the user I/F section 14 together with time information upon operation. Examples of a user action include, for example, channel switching, input switching, playback, pause, stop, fast forwarding, rewinding, viewpoint switching, arbitrary viewpoint specification, program reservation, program table display, content list confirmation, power source OFF operation, and the like. A user action is not limited to the operation of the buttons or switches required for video change or the like, but a broad operation instruction action through which imaging and analysis is to be made, such as gesture performed by a user with the intention for providing an operation instruction, may also be included. Data of a user action is sent from the user I/F section 14 through the control section 17 to the user action storage section 18. Also, data of an operation instruction from a display device or the like is sent from the input/output I/F section 15 through the control section 17 to the user action storage section 18 for storage. The user action storage section 18 receives an instruction from the control section 17, reads out data of the stored user action, and sends it to the control section 17.

For content recorded by a multi-viewpoint video, the viewpoint information storage section 19 stores viewpoint information when viewed by a viewer the previous time or at the time of playback interruption. This viewpoint information is sent from the control section 17 to the viewpoint information storage section 19. The viewpoint information storage section 19 sends the stored viewpoint information to the control section 17 based on the instruction given by the control section 17.

Figure 2:
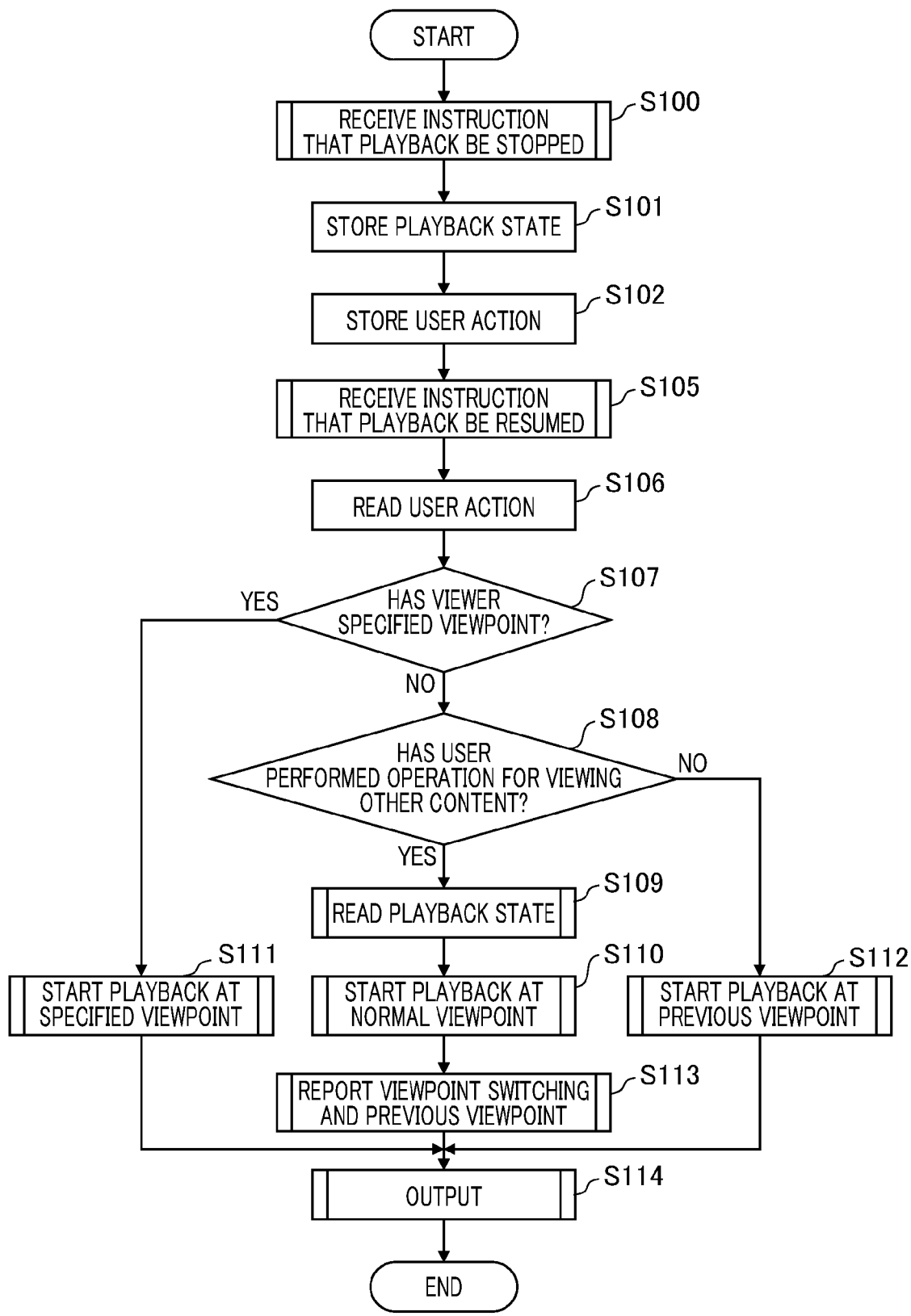
FIG. 2 is a flowchart illustrating viewpoint switching control of a video to be output during playback of the content.

Next, the control of a viewpoint switching operation will be described with reference to the flowchart shown in FIG. 2. This operation is to switch a viewpoint automatically upon the resumption of content playback according to the interruption state of content viewing, and is performed in accordance with a program executed by the control section 17.

In step S100, when a user provides instructions that playback be stopped, the user I/F section 14 receives an instruction signal, and the control section 17 confirms the instruction content. In step S101, the control section 17 stores information about a time code, viewpoint information, and stop time at the time of receiving an instruction from a user that playback be stopped. In accordance with the instruction given by the control section 17, the viewpoint information storage section 19 stores viewpoint information, the record/playback control section 6 stores a time code, and the user action storage section 18 stores information about a stop time together with information about an operation instruction that playback be stopped.

In step S102, the control section 17 acquires user action data during a playback interruption period and stores it in the user action storage section 18. Upon connection with a display device, the control section 17 acquires not only the data of a user action relating to the record/playback apparatus 1 but also the data of a user action performed by the display device, and causes the user action storage section 18 to store them.

In step S105, the user I/F section 14 is notified that a user has provided instructions that playback be resumed. The user I/F section 14 receives a user's operation instruction, and the control section 17 confirms the instructions that playback be resumed. At this time, when a user provides instructions about the viewpoint, the control section 17 also performs such confirmation. In step S106, reading processing for reading information about a user action performed during a viewing interruption period is performed. The control section 17 provides a request to the user action storage section 18 to thereby read the information stored in step S102, i.e., the history information for a user action performed during an interruption period.

In step S107, processing for determining whether or not a user has specified a desired viewpoint is performed. The user I/F section 14 receives a user's operation instruction, and the control section 17 performs confirmation and determination. When a viewpoint is specified by a user operation, the process advances to step S111, whereas when a viewpoint is not specified, the process advances to step S108.

In step S108, the control section 17 examines a user action performed during an interruption period to thereby determine whether or not an operation, action, or the like for viewing other content has been made by a user. Examples of the operation or action for viewing other content include switching the set channel, an operation or action for viewing the other recorded content, switching the channel on a display device, and operation or action for viewing an image of a device, which is connected to other devices, on a display device, and the like. When it is determined that the operation or action has been made, the process advances to step S109. On the other hand, when it is determined that the operation or action for viewing other content has not been made, the process advances to step S112.

In step S109, processing for reading information indicating the playback state, such as viewpoint information at the time of playback immediately before the storage process in step S101, a time code, a stop time, and the like, is performed. The control section 17 accesses the record/playback control section 6, the user action storage section 18, and the viewpoint information storage section 19 to thereby acquire a time code, a stop time, and viewpoint information, respectively. In step S110, the playback of content data is resumed at the normal viewpoint, and the playback is started from the time point indicated by the time code at the time of the previous playback. The term "normal viewpoint" refers to a default viewpoint specified by a broadcast station or a content manufacturer. The control section 17 provides a playback instruction to the record/playback control section 6, sends an instruction about a viewpoint during playback to the viewpoint switching control section 11, and causes the block provided on the rear stage to select and output the required viewpoint video data. Then, the process advances to step S113. Note that when an instruction about an arbitrary viewpoint is made by a user, the control section 17 provides instructions to the arbitrary viewpoint video generation section 10 to cause it to generate image data. Also, the control section 17 provides instructions to the viewpoint switching control section 11 so that the viewpoint switching control section 11 outputs the video data obtained from the arbitrary viewpoint video generation section 10 to the rear stage.

In step S111, the playback of content data is started at the viewpoint specified by a user. The playback start time point is a time indicated by the time code at the time of the previous playback. Then, the process advances to step S114. In step S112, the playback of content data is started at the viewpoint set at the time of the previous playback. The playback start time point is a time indicated by the time code at the time of the previous playback. Then, the process advances to step S114.

Figure 3:
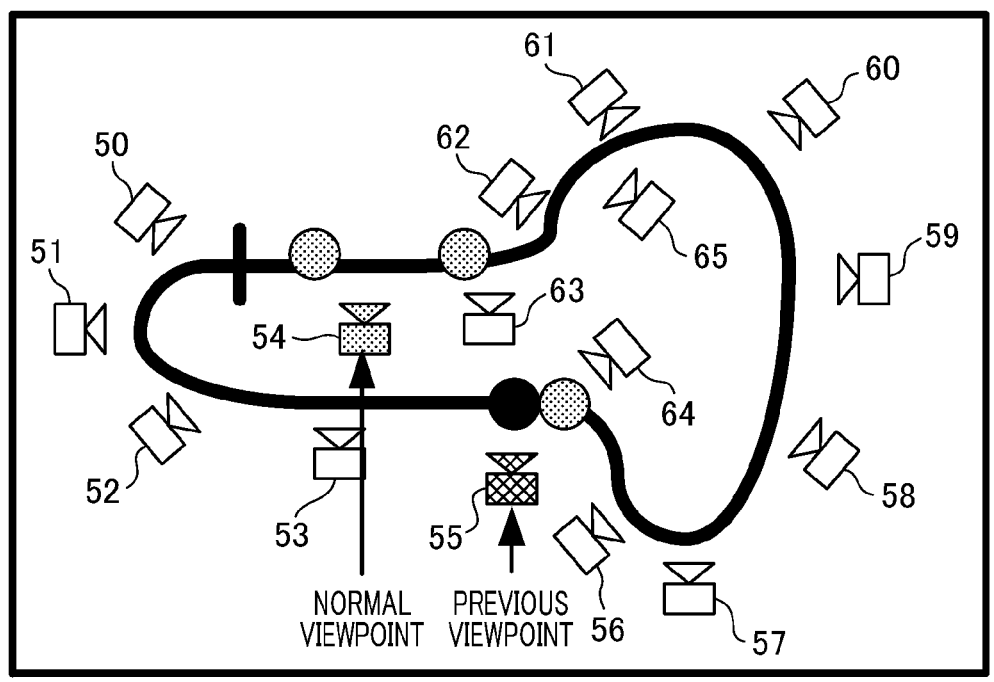
FIG. 3 is a diagram illustrating an example of GUI display by which a user is notified about viewpoint information.

In step S113, processing for notifying viewpoint switching and the previous viewpoint information to a user through a menu screen or the like is performed. Through this notification, a user grasps the situation that the viewpoint is switched in step S109 and content data is being played back at a normal viewpoint, the previous viewpoint information, and the like by watching a GUI screen, drawings, or the like. FIG. 3 schematically shows a camera arrangement in a circuit course as an example of a GUI screen according to viewpoint information. Each of the viewpoints 50 to 65 indicated by the symbols of the camera represents a viewpoint at which a user can view a captured image using a camera. The viewpoint 55 represents the viewpoint immediately prior to playback interruption, and the viewpoint 54 represents the aforementioned normal viewpoint. By using such display, a user can visually grasp the situation that a viewpoint has been switched, the arrangement of a viewpoint before or after switching, the presence of the other viewable viewpoints, and the like. The control section 17 provides instructions to the GUI control section 12 to cause it to generate GUI data, and the data is sent to the blend section 13. The blend section 13 receives an instruction from the control section 17, and combines the content video data with the GUI data generated by the GUI control section 12, and outputs a video signal. Examples of a screen combining method include a method for combining a dual screen, and a method for combining a GUI data video so as to overwrite a content video. Also, a method for displaying GUI data only for a predetermined time (e.g., 1 min) after playback, and deleting the figure of viewpoint information and the video of the previous viewpoint from a screen after a lapse of a predetermined time period to thereby switch to only a video at the normal viewpoint may also be employed.

After steps S111 to 113, the process advances to step S114, and the input/output I/F section 15, which has received an instruction from the control section 17, outputs a video signal obtained from the blend section 13 to a display device (not shown).

According to the first embodiment, it is determined whether the viewpoint at the time of the resumption after playback interruption should be the normal viewpoint or the previous viewpoint depending on a user action to thereby start the playback of video. Then, the user is notified about the multi-viewpoint information or arbitrary viewpoint information, whereby a situation can be prevented wherein a user forgets the fact that the viewing content is a multi-viewpoint content or an arbitrary viewpoint content and thus keep viewing it. Therefore, an opportunity through which a multi-viewpoint content or an arbitrary viewpoint content can be effectively viewed is given to a user, resulting in an improvement in convenience of use.

Second Embodiment

Figure 4:
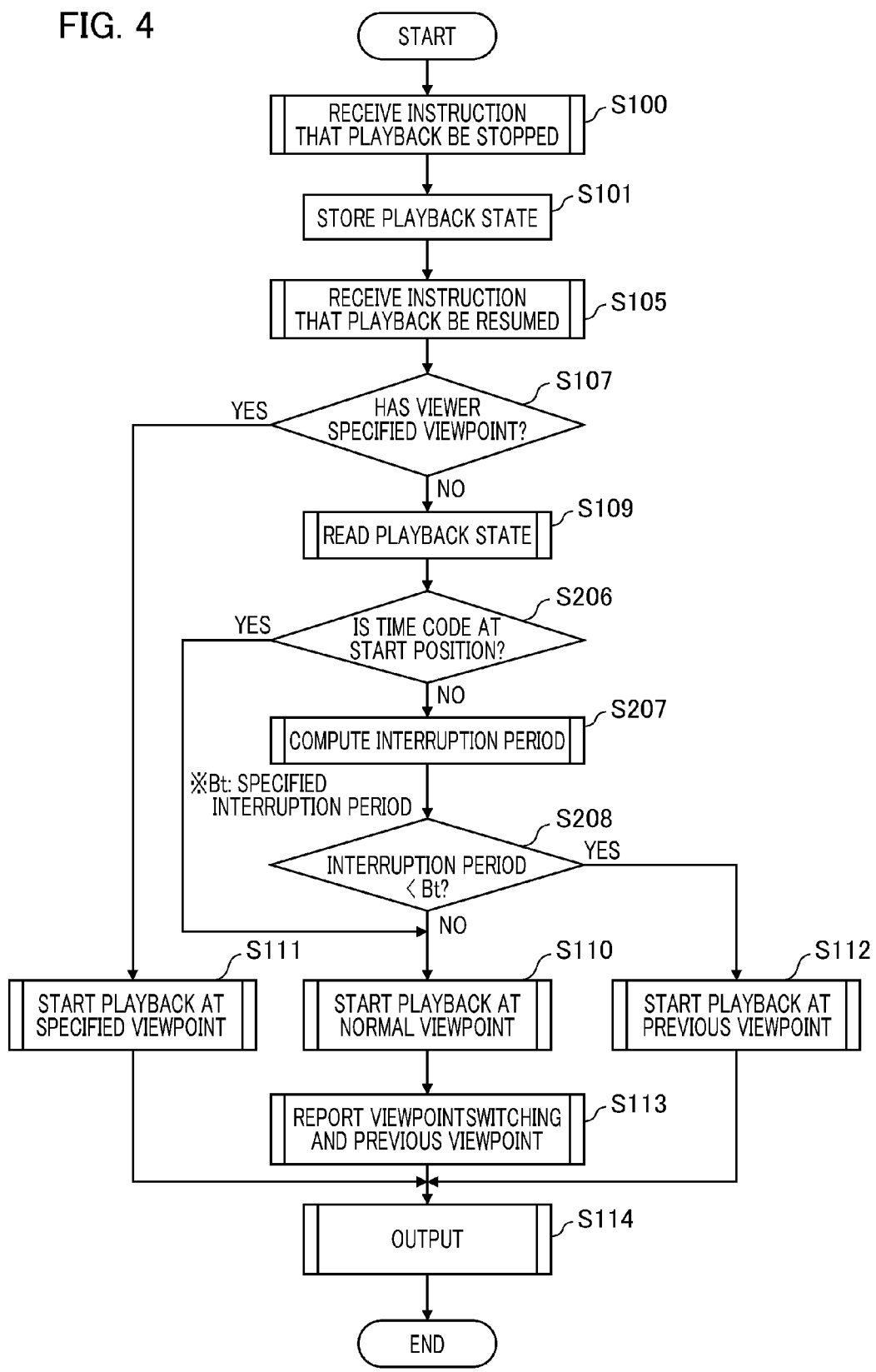
FIG. 4 is a flowchart illustrating video viewpoint switching control according to a second embodiment of the present invention.

Next, a second embodiment of the present invention will be described. In the second embodiment, when the playback of a video is interrupted, a first viewpoint specified prior to the interruption or a second viewpoint previously specified for a playback video is selected upon the resumption of the playback of the content. Depending on the length of the period during which a view of the content is interrupted, a viewpoint is automatically switched upon the resumption of the playback of the content. Note that the configuration of the apparatus is the same as that in the first embodiment, and the operation thereof will be described below with reference to the flowchart shown in FIG. 4. The difference between the flowcharts shown in FIG. 4 and FIG. 2 is that the process advances from step S101 (playback state storage) through step S105 to step S107, and there are steps S206 to S208 subsequent to step S109. Thus, a description relating to the same processing as that in the first embodiment will be omitted, and the differences will be mainly given on the following description.

After step S101, the process advances to step S105. Then, a user provides instructions that playback be started, and the control section 17 receives an instruction signal from the user I/F section 14. Next, in step S107, it is determined whether or not a viewpoint at which a user wishes to view video has been specified. When a desired viewpoint has been specified, the process advances to step S111, whereas when a viewpoint has not been specified, the process advances to step S109. Here, information about the viewpoint information at the time of the stored previous playback, a time code, and a stop time is read as information indicating the playback state, and then the process advances to step S206.

In step S206, the control section 17 determines whether or not the time code is at the start position of the content. When the time code is at the start position, the process advances to step S110. When the time code is not at the start position but at the intermediate position of the content, the process advances to step S207. Here, the control section 17 computes a playback interruption period. The term "interruption period" refers to a period from a previous playback stop time to a playback resumption time, and the length of the period represents a difference time between both times.

In step S208, the control section 17 compares the length of the interruption period calculated in step S207 with the previously specified period (hereinafter referred to as "specified interruption period" and indicated by "Bt"). As a result, when it is determined that the length of the interruption period is equal to or longer than Bt, the process advances to step S110 and the playback of the content is started at a normal viewpoint. Then, in step S113, viewpoint information is reported to a user. On the other hand, when it is determined that the length of the interruption period is less than Bt, the process advances to step S112 and the playback of the content is started at the viewpoint at the time of the previous playback.

According to the second embodiment, it is determined whether the viewpoint at the time of the resumption after playback interruption should be the normal viewpoint or the previous viewpoint depending on the calculated length of the interruption period to thereby start the playback of video. Specifically, when the length of the interruption period is less than a predetermined baseline time, the playback is started at the viewpoint immediately before interruption. Then, multi-viewpoint information or arbitrary viewpoint information is reported to a user, whereby a situation can be prevented wherein a user may forget the fact that the viewing content is a multi-viewpoint content or an arbitrary viewpoint content and thus keep viewing it.

Third Embodiment

Figure 5:
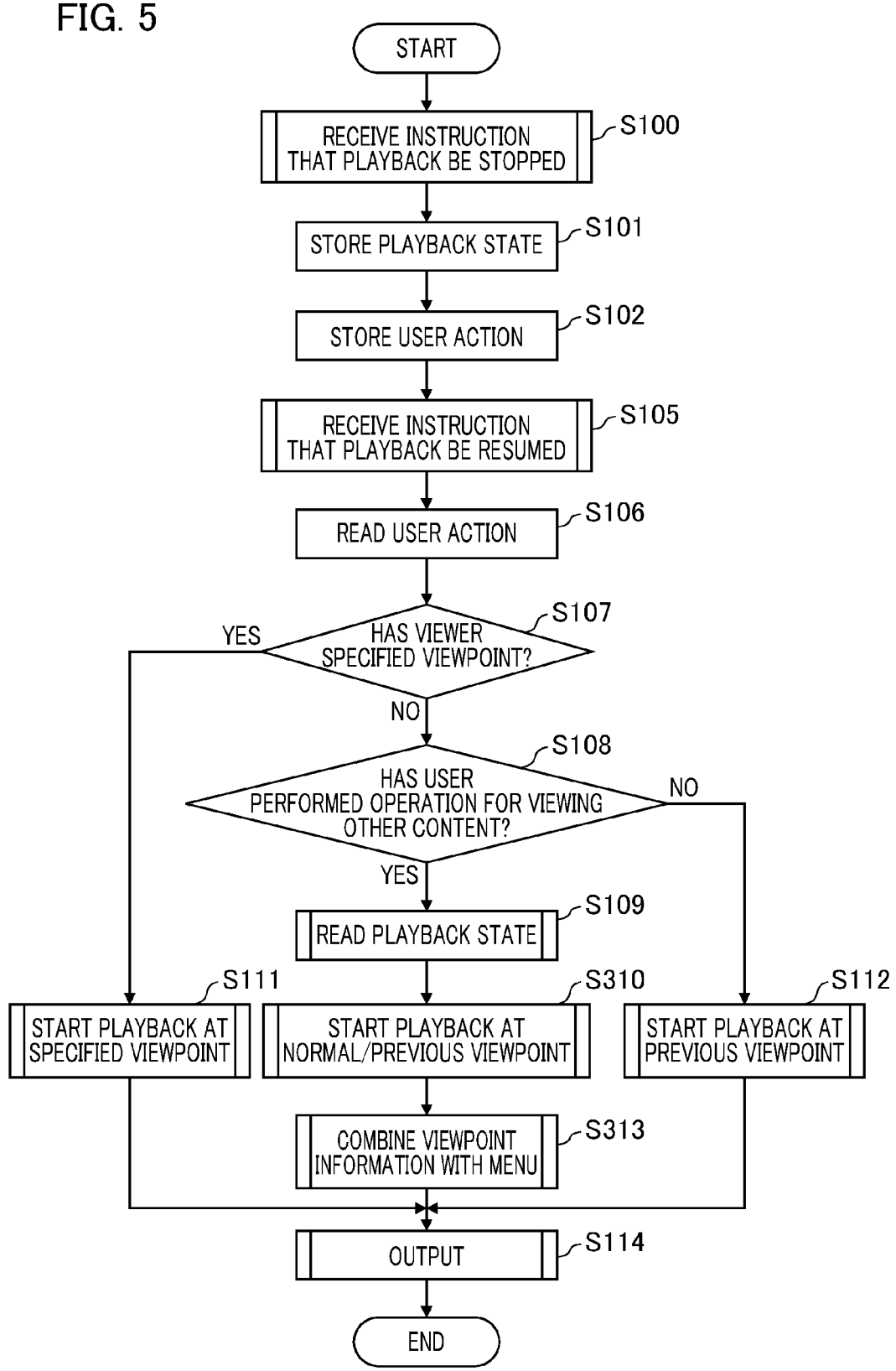
FIG. 5 is a flowchart illustrating video viewpoint switching control according to a third embodiment of the present invention.

Next, a third embodiment of the present invention will be described. In the third embodiment, a first viewpoint specified prior to an interruption or a second viewpoint previously specified for the first viewpoint and a playback video are selected upon the resumption of the playback of the content. In other words, the apparatus plays back the viewpoint at the time of the resumption after playback interruption as the viewpoint immediately before interruption, or plays back a video using a dual screen showing the normal viewpoint and the previous viewpoint depending on a user action, and then multi-viewpoint information or arbitrary viewpoint information is reported to a user. The configuration of the apparatus is the same as that in the first embodiment, and the operation thereof will be described below with reference to the flowchart shown in FIG. 5. A description will be given of steps S310 and S313 that are different from the steps shown in FIG. 2.

After step S109, the process advances to step S310, and the playback of the video is started at the normal viewpoint and the previous viewpoint. The time point of the resumption is the time indicated by the time code at the time of the previous playback. The control section 17 provides a playback instruction to the record/playback control section 6. Then, the control section 17 sends an instruction about the viewpoint during playback to the viewpoint switching control section 11, controls the viewpoint switching control section 11 such that the video data of the viewpoint is selected, and outputs it to the blend section 13. When the previous viewpoint is an arbitrary viewpoint, the control section 17 provides instructions to the arbitrary viewpoint video generation section 10 to cause it to generate image data. The control section 17 provides instructions to the viewpoint switching control section 11 such that the video data obtained from the arbitrary viewpoint video generation section 10 and the video data at the normal viewpoint are output to the blend section 13. Then, the process advances to step S313.

In step S313, information about the previous viewpoint and the normal viewpoint is presented to a user using the GUI screen or the like shown in FIG. 3. The blend section 13 combines the videos such that the video of the previous viewpoint, and the video at the normal viewpoint, and the generated video indicating viewpoint information can be displayed on a dual screen to thereby output it to the input/output I/F section 15. The control section 17 provides instructions to the GUI control section 12 about the generation of a display video in which viewpoint information is reported using a chart, and the GUI control section 12 generates the display video data and sends it to the blend section 13. The blend section 13 combines the video of the previous viewpoint, the video at the normal viewpoint, and the display video relating to the viewpoint information generated by the GUI control section 12 on a screen in accordance with an instruction from the control section 17. The blend section 13 reduces and combines the video of the respective viewpoints as required. When a request from a user is not made after a lapse of a predetermined time (e.g., 1 min), only the video at the normal viewpoint is output from the input/output I/F section 15.

According to the third embodiment, the video at the previous viewpoint and the video at the normal viewpoint are simultaneously played back or the playback of the video is started at the previous viewpoint depending on a user action made during an interruption period. When the operation or action for viewing other content is made by a user during the interruption period, the video of the previous viewpoint and the video at the normal viewpoint are played back on a dual screen for a predetermined time upon the resumption, whereby a user can view a multi-viewpoint video or an arbitrary viewpoint video by comparing them. Therefore, opportunities by which a multi-viewpoint video effect or an arbitrary viewpoint video effect is conveyed to a user are enhanced.

Fourth Embodiment

Figure 6:
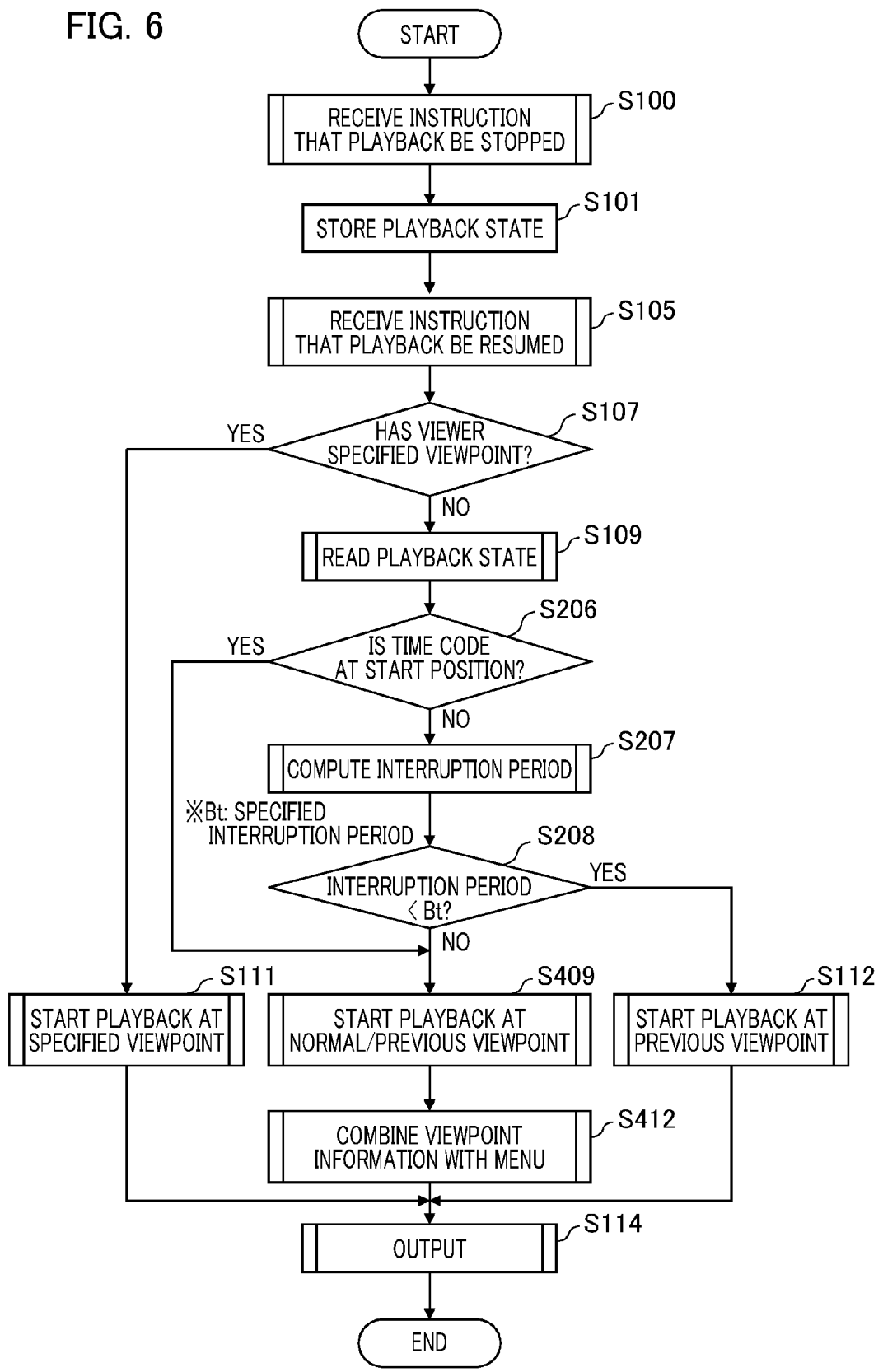
FIG. 6 is a flowchart illustrating video viewpoint switching control according to a fourth embodiment of the present invention.

Next, a fourth embodiment of the present invention will be described. In the fourth embodiment, a first viewpoint specified prior to an interruption or a second viewpoint previously specified for the first viewpoint and a playback video is selected upon the resumption of the playback of the content. Depending on the length of the period during which a view of the content is interrupted, the present apparatus plays back the viewpoint at the time of playback resumption as the viewpoint immediately before interruption or plays back the video of the respective viewpoints as the normal viewpoint and the previous viewpoint using a dual screen. At this time, multi-viewpoint information or arbitrary viewpoint information is reported to a user. The configuration of the apparatus is the same as that in the first embodiment, and the operation thereof will be described below with reference to the flowchart shown in FIG. 6. A description will be given of steps S409 and S412 that are different from the steps shown in FIG. 4.

In step S208, when it is determined that the length of the interruption period is equal to or longer than Bt, the process advances to step S409, the playback of video is started at the normal viewpoint and at the previous viewpoint. The time point of the resumption is the time indicated by the time code at the time of the previous playback. Next, the process advances to step S412, and information about the previous viewpoint and the normal viewpoint is presented to a user using the GUI screen or the like shown in FIG. 3. Then, the process advances to step S114.

According to the fourth embodiment, when it is determined that the length of the interruption period is equal to or longer than the baseline time, the video of the previous viewpoint and the video at the normal viewpoint are simultaneously played back to be displayed on a dual screen at the time of playback after interruption. At this time, multi-viewpoint information or arbitrary viewpoint information is reported to a user. Therefore, as in the third embodiment, the convenience of use for the user can be further improved.

Fifth Embodiment

Figure 7:
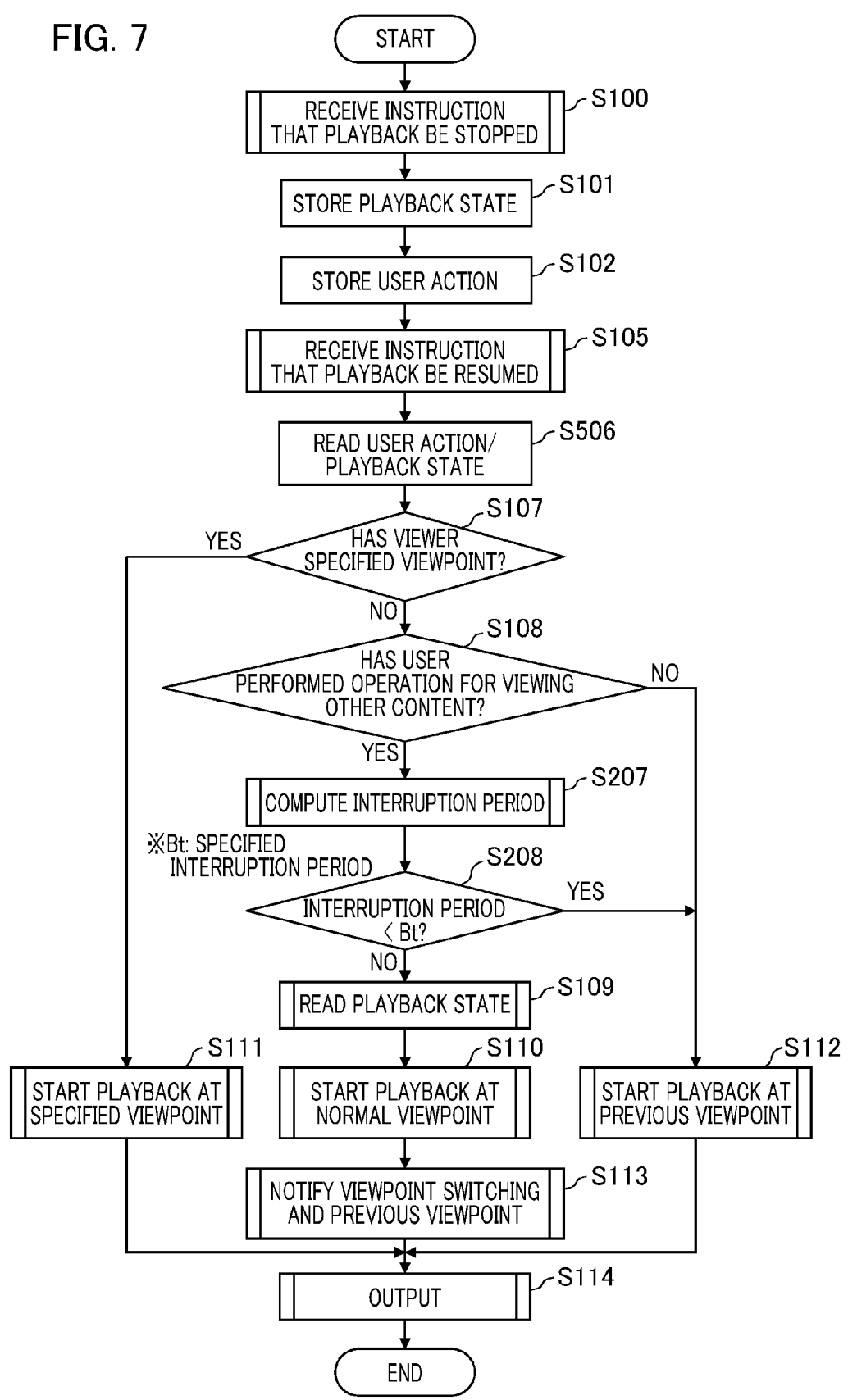
FIG. 7 is a flowchart illustrating video viewpoint switching control according to a fifth embodiment of the present invention.

Next, a fifth embodiment of the present invention will be described. In the fifth embodiment, a first viewpoint specified prior to an interruption or a second viewpoint previously specified for a playback video is selected upon the resumption of the playback of the content. Depending on the user action and the length of the period during which a view of the content is interrupted, the present apparatus automatically switches the viewpoint upon the resumption of the playback of the content. The configuration of the apparatus is the same as that in the first embodiment, and the operation thereof will be described below with reference to the flowchart shown in FIG. 7. The difference between the flowcharts shown in FIG. 7 and FIG. 2 is step S506 and steps S207 and S208 subsequent to step S108. Thus, mainly these processes will be described below.

After step S105, in step S506, processing for reading user action data, viewpoint information, a time code, and information about a stop time of playback is performed. This processing is to perform steps S106 and S109 shown in FIG. 2 at once.

In step S108, when it is determined that the operation or action for viewing other content has been made by a user, the process advances to step S207, and a playback interruption period is calculated. In step S208, the length of the interruption period is compared with the aforementioned Bt. As a result, when the length of the interruption period is equal to or longer than Bt, the process advances to step S109, whereas when the length of the interruption period is less than Bt, the process advances to step S112. In the present embodiment, the process of step S109 (reading the playback state) is present between steps S208 and S110. However, when it is determined in S208 that the length of the interruption period is equal to or longer than Bt, the process may advance to step S110 with step S109 omitted.

According to the fifth embodiment, it is determined whether the viewpoint at the time of playback resumption should be the normal viewpoint or the previous viewpoint depending on a user action made during a playback interruption period and the length of the interruption period to thereby start the playback of video. Therefore, the effect of the first embodiment and the second embodiment is obtained.

Sixth Embodiment

Figure 8:
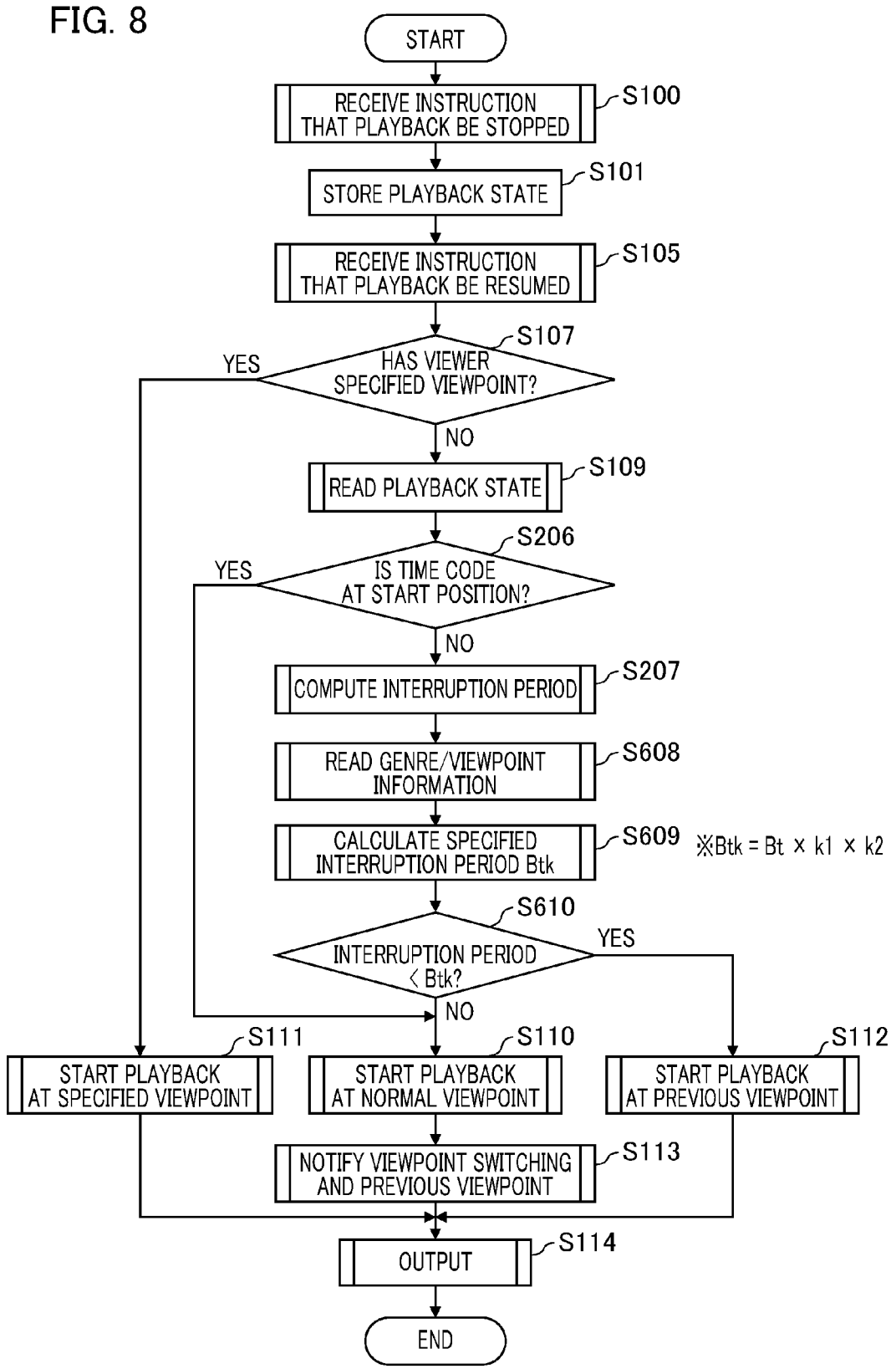
FIG. 8 is a flowchart illustrating video viewpoint switching control according to a sixth embodiment of the present invention.

Next, a sixth embodiment of the present invention will be described. In the sixth embodiment, a first viewpoint specified prior to an interruption or a second viewpoint previously specified for a playback video is selected upon the resumption of the playback of the content. Depending on the genre of the content, the viewpoint upon previous viewing, and the length of the period during which playback of the content is interrupted, the present apparatus automatically switches a viewpoint upon the resumption of the playback of the content. The configuration of the apparatus is the same as that in the first embodiment, and the operation thereof will be described below with reference to the flowchart shown in FIG. 8. The difference between the flowcharts shown in FIG. 8 and FIG. 4 is that steps S608 to S610 are present between steps S207 and S110. Thus, mainly these processes will be described below.

In step S608, processing is performed for reading the genre of the content to be played back, the previous viewpoint, and its viewpoint information. The control section 17 provides a request to the record/playback control section 6 to thereby acquire the genre of the content and its viewpoint information from the record/playback control section 6. When the record/playback control section 6 receives a request from the control section 17, the record/playback control section 6 receives the genre of the content to be played back, the viewpoint, and the viewpoint information from the data recording section 7. Also, the control section 17 provides a request to the viewpoint information storage section 19, and thereby receives the previous viewpoint and its viewpoint information.

In step S609, the control section 17 calculates the specified interruption period (Btk). Btk is calculated from the following formula in which the specified interruption period "Bt" described in the second embodiment is multiplied with the coefficient k1 determined depending on the genre of the content and the coefficient k2 determined depending on the previous viewpoint and its viewpoint information.

[Formula 1]

$$Btk = Bt \times k1 \times k2 \quad \text{(Formula 1)}$$

The values of the coefficients k1 and k2 may be a predetermined fixed value, or may vary depending on user's specification or necessity within the permissible limits.

The relationship between the viewing genre and the coefficient k1 is exemplified in Table 1.

TABLE 1

| GENRE | DETAIL | NECESSITY OF VIEWPOINT DETERMINATION | INTERRUPTION PERIOD COEFFICIENT 1 (k1) |
|---|---|---|---|
| SPORT | BASEBALL | YES | 1-FOLD |
| | SOCCER | YES | 1-FOLD |
| | RUGBY | YES | 1-FOLD |
| | VOLLEYBALL | YES | 1-FOLD |
| | BASKETBALL | YES | 1-FOLD |
| | AMERICAN FOOTBALL | YES | 1-FOLD |
| | TENNIS | YES | 1-FOLD |
| | HORSE RACING | YES | 1-FOLD |
| | SWIMMING | YES | 1-FOLD |
| | TRACK AND FIELD (TRACK COMPETITION) | NO | 0.8-FOLD |
| | GYMNASTIC | YES | 1-FOLD |
| | MARATHON | NO | 0.8-FOLD |
| | MOTOR SPORT | NO | 0.8-FOLD |
| | ALPINE SKIING | NO | 0.5-FOLD |
| | SKI JUMP | YES | 1-FOLD |
| MUSIC | STUDIO | NO | 0.8-FOLD |
| | LIVE | NO | 0.8-FOLD |
| DRAMA | — | NO | 0.5-FOLD |
| MOVIE | — | NO | 0.5-FOLD |
| NEWS | — | NO | 0.5-FOLD |
| VARIETY | — | NO | 0.5-FOLD |
| EDUCATION | — | NO | 0.5-FOLD |

The aforementioned table 1 shows an example of the relationship between the genre of the content and its detailed information, the presence or absence of the necessity for viewpoint determination, and the interruption period coefficient 1 (coefficient k1). In the present example, the coefficient values for sport programs are greater than those for other programs. In addition, the coefficient value in the case in which the necessity for viewpoint determination is "present" is set greater as compared with that in the case in which the necessity for viewpoint determination is "absent".

The relationship among viewpoint, its viewpoint information, and the coefficient k2 is exemplified in Table 2.

TABLE 2

| VIEWPOINT TYPE | VIEWPOINT No. | INTERRUPTION PERIOD COEFFICIENT 2 (k2) |
|---|---|---|
| FIXED CAMERA | 1, 2, 3, 4, 5, 6, 7, 8, 9, 10, 11, 12 | 1-FOLD |
| MOBILE CAMERA | 13, 14, 15 | 0.8-FOLD |
| ARBITRARY VIEWPOINT | DEPENDING ON VIEWPOINT DIRECTION | SEE THE FOLLOWING TABLE |

| VIEWPOINT DIRECTION | INTERRUPTION PERIOD COEFFICIENT 2 (k2) |
|---|---|
| CENTRAL DIRECTION | 1-FOLD |
| STAND-SIDE | 0.7-FOLD |
| OTHER VIEWPOINT | 0.5-FOLD |

The aforementioned table 2 shows an example of the relationship among the viewpoint type, its viewpoint position, and the interruption period coefficient 2 (coefficient k2), or the relationship between the viewpoint direction and the interruption period coefficient 2 (coefficient k2). While, in the present embodiment, a description has been given of a Btk calculation example using two coefficients, Btk can be calculated in the various forms such that the types of the coefficients are increased as required. For example, given that the adjusting coefficients depending on the genre, viewpoint, and the like of the video to be played back are k1, k2, ... kn (n≥1), the Btk calculation formula is generalized by the following formula in which these coefficients are multiplied by a predetermined time Bt.

[Formula 2]

$$Btk = Bt \times k1 \times k2 \times kn \qquad \text{(Formula 2)}$$

In step S610, the control section 17 compares the length of the interruption period calculated in S207 with Btk. When it is determined that the length of the interruption period is less than Btk, the process advances to step S112, whereas when it is determined that the length of the interruption period is equal to or longer than Btk, the process advances to step S110.

According to the sixth embodiment, the playback of video is started at the normal viewpoint or the previous viewpoint depending on the genre of the content to be viewed by a user, the viewpoint or its viewpoint information, and the length of the playback interruption period. Since the judgment reference value for the length of the interruption period is changed depending on the genre of the content, a more detailed viewpoint switching control can be made depending on the type of the viewing video.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-074966 filed Mar. 29, 2010 which is hereby incorporated by reference herein in its entirety.

What is claimed is:

1. A playback apparatus that is capable of playing back a multi view-angle video content or arbitrary view-angle video content, the playback apparatus comprising:
   an information storage unit configured to store information about a first view-angle specified prior to an interruption when the playback of a first video program is interrupted; and
   a control unit configured to carry out control so as to determine whether or not an operation instruction action for viewing a second video program, wherein said second video program is different from said first video program, is performed during the period of playback interruption, playback, from an interrupted play position of the interrupted first video progam, a second view-angle video previously specified for the video of the first video program when the operation instruction action for viewing the second video program is made, and playback, from the interrupted play position of the interrupted first video program, the first view-angle video indicated by the information read out from the information storage unit when the operation instruction action for viewing the second video program is not made.

2. A playback apparatus that is capable of playing back a multi view-angle video content or arbitrary view-angle video content, the playback apparatus comprising:
   an information storage unit configured to store information about a first view-angle specified prior to an interruption of when the playback of a video program is interrupted; and
   a control unit configured to carry out control so as to: (a) determine the length of the interruption period when the playback of the video program is resumed, and (b) to playback, from an interrupted play position of the interrupted video program, a second view-angle video previously specified for the video program when the length of the interruption period is equal to or longer than a baseline time, and (c) to playback, from the interrupted play position of the interrupted video program, the first view-angle video indicated by the information read out from the information storage unit when the length of the interruption period is less than the baseline time.

3. The playback apparatus according to claim 1, wherein the control unit specifies the first view-angle and the second view-angle to resume the playback of the video of the interrupted first video program from the two view-angles using a dual screen when the operation instruction action for viewing the second video program is made.

4. The playback apparatus according to claim 2, wherein the control unit specifies the first view-angle and the second view-angle to resume the playback of the video of the interrupted video program from the two view-angles using a dual screen when the length of the interruption period is equal to or longer than the baseline time.

5. The playback apparatus according to claim 2, wherein the control unit determines the length of the interruption period using the baseline time corresponding to the genre of the video of the interrupted video program.

6. The playback apparatus according to claim 5, wherein the control unit calculates the baseline time by the multiplication of a plurality of adjusting coefficients corresponding to the genre or the view-angle of the video of the interrupted video program.

7. The playback apparatus according to claim 1, further comprising:
   a generation unit configured to generate video data indicating information about the first view-angle and the second view-angle in order to report a user about view-angle switching.

8. The playback apparatus according to claim 2, further comprising:
   a generation unit configured to generate video data indicating information about the first view-angle and the second view-angle in order to report a user about view-angle switching.

9. The playback apparatus according to claim 1, further comprising:
   a view-angle switching control unit configured to output a video signal of the view-angle specified by the control unit; and
   an operation storage unit configured to store information about an operation instruction action received during a playback interruption period.

10. The playback apparatus according to claim 2, further comprising:
a view-angle switching control unit configured to output a video signal of the view-angle specified by the control unit; and
an operation storage unit configured to store information about an operation instruction action received during a playback interruption period.

11. A playback method executed by a playback apparatus that is capable of playing back a multi view-angle video content or arbitrary view-angle video content, the playback method comprising the steps of:
receiving a user's operation instruction;
storing information about a view-angle specified prior to an interruption when the playback of a first video program is interrupted;
determining whether or not an operation instruction action for viewing a second video program, wherein said second video program is different from said first video program, is performed during the period of playback interruption; and
playing back, from an interrupted play position of the interrupted first video program, a second view-angle video previously specified for the first video program when the operation instruction action for viewing the-second video program is made during a playback interruption period, and playing back, from the interrupted play position of the interrupted first video program, the stored first view-angle video when the operation instruction action for viewing the second video program is not made.

12. A playback method executed by a playback apparatus that is capable of playing back a multi view-angle video content or arbitrary view-angle video content, the playback method comprising the steps of:
storing information about a first view-angle specified prior to an interruption when the playback of a video program is interrupted; and
determining the length of the interruption period when the playback of the video program is resumed, (a) playing back, from an interrupted play position of said interrupted video program, a second view-angle video previously specified for the video program when the length of the interruption period is equal to or longer than a baseline time, and (b) playing back, from the interrupted play position of the interrupted video program, the first view-angle video indicated by the information stored in the step when the length of the interruption period is less than the baseline time.

13. The playback apparatus according to claim 1, wherein the information storage unit further stores time information about playback position when the playback of the video of the interrupted first video program is interrupted, and wherein
the control unit carries out control of playing back of the video of the interrupted first video program based on the time information stored by the information storage unit when the playback of the video of the interrupted first video program is resumed.

14. The playback apparatus according to claim 2, wherein the information storage unit further stores time information about playback position when the playback of the video program is interrupted, and wherein
the control unit carries out control of playing back of the video program based on the time information stored by the information storage unit when the playback of the video program is resumed.

15. The playback method according to claim 11, wherein the first view-angle and the second view-angle are specified for resuming the playback of the first video program from the two view-angles using a dual screen when the operation instruction action for viewing the second video program is made.

16. The playback method according to claim 12, wherein the first view-angle and the second view-angle are specified for resuming the playback of the video program from the two view-angles using a dual screen when the length of the interruption period is equal to or longer than the baseline time.

17. The playback method according to claim 12, wherein the length of the interruption period is determined using the baseline time corresponding to the genre of the video program.

18. The playback method according to claim 17, wherein the baseline time is calculated by the multiplication of a plurality of adjusting coefficients corresponding to the genre or the view-angle of the video program.

19. The playback method according to claim 11, further comprising the steps of:
generating video data indicating information about the first view-angle and the second view-angle in order to report a user about view-angle switching.

20. The playback method according to claim 12, further comprising the steps of:
generating video data indicating information about the first view-angle and the second view-angle in order to report a user about view-angle switching.

21. The playback method according to claim 11, further comprising the steps of:
outputting a video signal of the view-angle specified in the playing back step; and
storing information about an operation instruction action received during a playback interruption period.

22. The playback method according to claim 12, further comprising:
outputting a video signal of the view-angle specified in the playing back step; and
storing information about an operation instruction action received during a playback interruption period.

23. The playback method according to claim 11, wherein time information about playback position is further stored in the storing step when the playback of the first video program is interrupted, and
wherein the first video program is played back in the playing back step based on the time information stored by the information storage unit when the playback of the first video program is resumed.

24. The playback method according to claim 12, wherein time information about playback position is further stored in the storing step when the playback of the video program is interrupted, and
wherein the video program is played back in the playing back step based on the time information stored by the information storage unit when the playback of the video program is resumed.

* * * * *